Patented Feb. 7, 1933

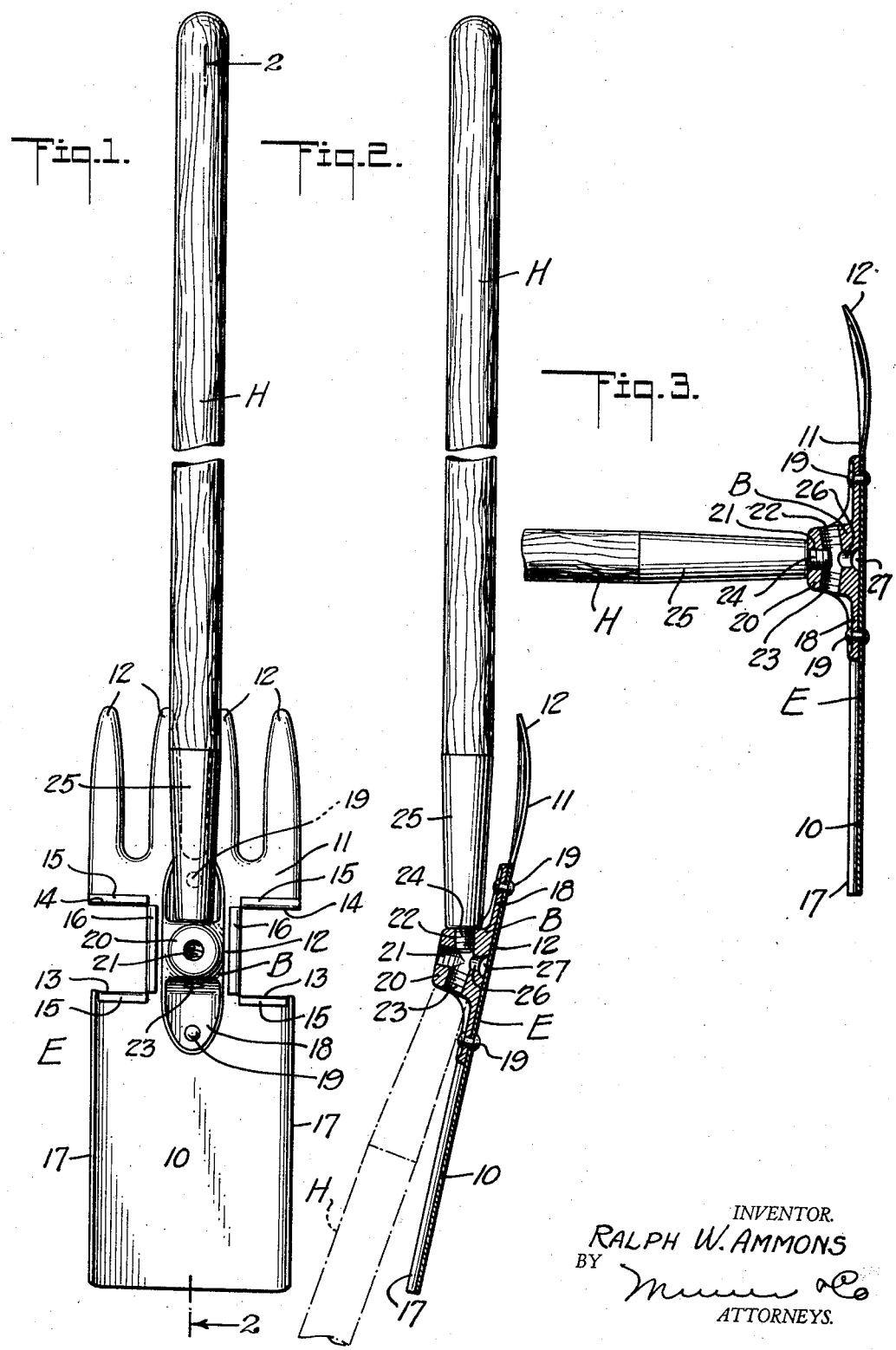

1,896,568

UNITED STATES PATENT OFFICE

RALPH W. AMMONS, OF LOS ANGELES, CALIFORNIA

EARTHWORKING IMPLEMENT

Application filed March 24, 1931. Serial No. 524,993.

My invention relates to and has for its purpose the provision of an implement of substantial and inexpensive construction particularly adapted for use in digging and cultivating the soil, and structurally characterized in such manner as to enable it to be efficiently employed as a spade, fork, hoe or rake by the expedient of predetermined adjustments capable of being performed with the utmost ease and dispatch.

I will describe only one form of earthworking implement embodying my invention, and will then point out the novel features thereof in the claim.

In the accompanying drawing:

Figure 1 is a view in front elevation of one form of earthworking implement embodying my invention, and illustrating the implement adjusted for use as a spade.

Figure 2 is a vertical sectional view taken on the line 2—2 of Figure 1 and looking in the direction of the arrows.

Figure 3 is a fragmentary view similar to Figure 2 and illustrating the implement adjusted for use as a hoe or rake.

Referring specifically to the drawing in which similar reference characters designate similar parts in each of the several views, my invention in its present embodiment comprises an earthworking element designated generally at E, and a handle H to which the element is capable of being secured in various positions of angular adjustment in accordance with the particular operation to be performed by the implement.

In the present instance the element E is constructed from a sheet of metal to provide a substantially flat and rectangular blade 10 adapted for digging and hoeing operations, and a toothed blade 11 having a plurality of tines 12 and adapted for raking and cultivating operations. The blades 10 and 11 are rigidly connected so as to extend in opposed directions by means of a relatively narrow portion or web 12 which is centrally disposed with respect to a common longitudinal axis of the blades and provides on the heel of each blade respectively, abutments or shoulders 13 and 14 adapted to be engaged by the foot of the operator to force the respective blade into the soil as will be understood.

The edges of the shoulders 13 and 14 as well as the side edges of the web 12 are bent upon themselves as indicated respectively at 15 and 16 to reinforce the element, and the side edges of the blade 10 are partially curled as indicated at 17 so as to also stiffen this blade against bending under the stresses to which it is subjected in use.

A bracket designated generally at B is provided with a base flange 18 which may be welded or secured as shown by rivets 19 to the element E so as to span the web 12 longitudinally as clearly shown in the drawing and thus permanently secure the bracket to the element in a fixed position.

The bracket is provided with a head 20 which projects from the flange 18 intermediate its ends and is provided with internally threaded bores 21, 22 and 23 disposed in intersecting relation. The bore 21 extends at a right angle to the plane of the element E whereas the bores 22 and 23 extend in opposed directions longitudinally of the element as viewed in Figure 1 and at slight angles to the plane of the element as viewed in Figures 2 and 3.

Any of the bores 21, 22 and 23 is adapted to threadedly receive an externally threaded shank 24 projecting axially from a ferrule 25 receiving and fixed to the handle H so as to be permanently a part of the latter. Formed in the head 20 is a duct 26 which communicates with the several bores and with a transverse channel 27 in the base flange 18 for the purpose of permitting water, soil or any other foreign substances to discharge from the bores and thus prevent clogging of or damage to the threads of the latter.

The operation of the implement is as follows:

In the event that the implement is to be used for spading operations, the shank 24 is screwed into the bore 22 so that the blade 10 will project from the handle H at a slight angle as shown in full lines in Figure 2, whereas to use the implement as a fork, the shank is screwed into the bore 23 as shown in broken lines in this figure so that the toothed blade 11 projects at a slight angle from the handle.

To use the implement as a hoe or rake, the shank 24 is screwed into the bore 21 so that the blades 10 and 11 extend at a right angle in opposite directions from the handle for the use of one blade or the other as desired.

Although I have herein shown and described only one form of earthworking implement embodying my invention, it is to be understood that various changes and modifications may be made therein without departing from the spirit of the invention and the spirit and scope of the appended claim.

I claim:

An implement of the character described comprising an element, a bracket on the element having a plurality of threaded bores angularly related, and a handle having an externally threaded shank capable of being threaded into any one of said bores to detachably secure the element to the handle in different positions of adjustment, the bracket having a channel and a duct communicating with the channel and with the bores to enable foreign substances to discharge from the latter.

RALPH W. AMMONS.